(12) United States Patent
Chen

(10) Patent No.: US 11,232,226 B2
(45) Date of Patent: Jan. 25, 2022

(54) COLUMN VALUE-BASED SEPARATE AUTHORIZATION METHOD FOR STATISTICAL LIST OPERATIONS

(71) Applicant: CHENGDU QIANNIUCAO INFORMATION TECHNOLOGY CO., LTD., Sichuan (CN)

(72) Inventor: Dazhi Chen, Meishan (CN)

(73) Assignee: CHENGDU QIANNIUCAO INFORMATION TECHNOLOGY CO., LTD., Sichuan (CN)

( * ) Notice: Subject to any disclaimer, the term of this patent is extended or adjusted under 35 U.S.C. 154(b) by 182 days.

(21) Appl. No.: 16/636,879

(22) PCT Filed: Aug. 6, 2018

(86) PCT No.: PCT/CN2018/099066
§ 371 (c)(1),
(2) Date: Feb. 5, 2020

(87) PCT Pub. No.: WO2019/029500
PCT Pub. Date: Feb. 14, 2019

(65) Prior Publication Data
US 2020/0364364 A1 Nov. 19, 2020

(30) Foreign Application Priority Data

Aug. 7, 2017 (CN) .......................... 201710668290.0

(51) Int. Cl.
*G06F 21/62* (2013.01)
*G06F 21/60* (2013.01)
*G06Q 10/06* (2012.01)

(52) U.S. Cl.
CPC ........ *G06F 21/6227* (2013.01); *G06F 21/604* (2013.01); *G06Q 10/0631* (2013.01); *G06F 2221/2141* (2013.01)

(58) Field of Classification Search
CPC ............... G06F 21/6227; G06F 21/604; G06F 2221/2141; G06Q 10/0631
See application file for complete search history.

(56) References Cited

U.S. PATENT DOCUMENTS 5,751,949 A * 5/1998 Thomson ................ G06F 21/00
726/4
7,243,097 B1 * 7/2007 Agrawal ............. G06F 21/6227
(Continued)

FOREIGN PATENT DOCUMENTS

| CN | 102902767 A | 1/2013 |
| CN | 105426769 A | 3/2016 |

(Continued)

OTHER PUBLICATIONS

International Search Report in the international application No. PCT/CN2018/099066, dated Nov. 13, 2018.
(Continued)

*Primary Examiner* — Richard A McCoy
(74) *Attorney, Agent, or Firm* — Ladas & Parry, LLP

(57) ABSTRACT

Disclosed is a column value-based separate authorization method for statistical list operations, said method comprising a step of authorizing a statistical list operation and a step of selecting a grantee, said step of authorizing a statistical list operation comprising the following steps: S1: selecting a statistical list needing authorization; S2: selecting a column needing authorization in the statistical list, the selected column being a column determined by selection or determined automatically; S3: authorizing the operation for statistical data corresponding to all the column values in the selected column. The present invention enables separate authorization of the operation permissions for the statistical data in the statistical list according to the column values; one statistical list can meet different actual usage requirements after the authorization of different statistical data operation (Continued)

| Select a grantee | Select a statistical list | Select a column: signing department ||| 
|---|---|---|---|---|
| Zhang San<br>✓ Li Er<br>Wang Wu<br>...... | Statistical list of orders<br>Statistical list of work attendance<br>✓ Statistical list of sales contracts<br>...... | Column value | View | ...... |
| | | Unrestricted | | |
| | | Null | | |
| | | Sales department I | ✓ | |
| | | Sales department II | ✓ | |
| | | Sales department III | ✓ | |
| | | ... | | | permissions. Thus, the present invention is able to control the statistical data of the statistical list more strictly, improving the precision of management, meeting the usage requirements of enterprises and institutions in actual operations.

4 Claims, 6 Drawing Sheets

(56) References Cited

U.S. PATENT DOCUMENTS

| | | | | |
|---|---|---|---|---|
| 2004/0044655 | A1* | 3/2004 | Cotner | G06F 16/21 |
| 2004/0250098 | A1* | 12/2004 | Licis | G06F 21/604 |
| | | | | 713/193 |
| 2006/0095791 | A1* | 5/2006 | Wong | G06F 21/64 |
| | | | | 713/189 |
| 2006/0282433 | A1* | 12/2006 | Dutta | G06F 16/2448 |
| 2010/0262625 | A1* | 10/2010 | Pittenger | G06F 21/604 |
| | | | | 707/783 |
| 2016/0125189 | A1* | 5/2016 | Antonopoulos | G06F 21/6227 |
| | | | | 726/30 |
| 2020/0272750 | A1* | 8/2020 | Hoeffer | G06F 21/604 |

FOREIGN PATENT DOCUMENTS

| | | |
|---|---|---|
| CN | 107292588 A | 10/2017 |
| CN | 107315931 A | 11/2017 |
| CN | 107330344 A | 11/2017 |
| CN | 107340951 A | 11/2017 |
| CN | 107480544 A | 12/2017 |
| CN | 107480556 A | 12/2017 |

OTHER PUBLICATIONS

Written Opinion of the international Searching Authority in the international application No. PCT/CN2018/099066, dated Nov. 13, 2018 with English translation provided by Google Translate.

* cited by examiner

Statistical list of sales contracts

| Signing department | Quantity of signed contracts | Amount of signed contracts | Amount of received payments | Quantity of orders | Quantity of shipped products |
|---|---|---|---|---|---|
| Sales department I | *** | *** | *** | *** | *** |
| Sales department II | 13 | 150000 | 80000 | 10 | 2000 |
| Sales department III | *** | *** | *** | *** | *** |
| *** *** | *** *** | *** *** | *** *** | *** *** | *** *** |

FIG. 6

Statistical list of sales contracts

| Signing department | Quantity of signed contracts | Amount of signed contracts | Amount of received payments | Quantity of orders | Quantity of shipped products |
|---|---|---|---|---|---|
| Sales department II | 13 | 150000 | 80000 | 10 | 2000 |
| *** *** | *** *** | *** *** | *** *** | *** *** | *** *** |

FIG. 7

| Select a grantee | Select a statistical list | Select a column: signing department | | |
|---|---|---|---|---|
| Zhang San<br>✓ Li Er<br>Wang Wu<br>...... | Statistical list of orders<br>Statistical list of work attendance<br>✓ Statistical list of sales contracts<br>*** *** | Column value | View | ...... |
| | | Unrestricted | | |
| | | Null | | |
| | | Sales department I | ✓ | |
| | | Sales department II | ✓ | |
| | | Sales department III | ✓ | |
| | | ... | | |

FIG. 8

| Select a grantee | Select a statistical list | Select a column: signing department | | |
|---|---|---|---|---|
| Zhang San<br>✓ Li Er<br>✓ Wang Wu<br>...... | Statistical list of orders<br>Statistical list of work attendance<br>✓ Statistical list of sales contracts<br>*** *** | Column value | View | ··· ··· |
| | | Unrestricted | | |
| | | Null | | |
| | | Sales department I | | |
| | | Sales department II | | |
| | | Sales department III | | |
| | | ... | | |

FIG. 9

| Select a grantee | Select a statistical list | Last authorizer: Li Si | | |
|---|---|---|---|---|
| ✓ Zhang San<br>Li Er<br>Wang Wu<br>...... | Statistical list of orders<br>Statistical list of work attendance<br>✓ Statistical list of sales contracts<br>*** ***  | Operation time: 2015-5-21,11:00 | | |
| | | Select a column: signing department | | |
| | | Column value | View | ··· ··· |
| | | Unrestricted | | |
| | | Null | | |
| | | Sales department I | | |
| | | Sales department II | | |
| | | Sales department III | ✓ | |
| | | ... | | |

FIG. 10

| Select a grantee | Select a statistical list | Last authorizer: Li Si | | |
|---|---|---|---|---|
| | | Operation time: 2017-5-1,14:00 | | |
| Zhang San<br>✓ Li Er<br>Wang Wu<br>...... | Statistical list of orders<br>Statistical list of work attendance<br>✓ Statistical list of sales contracts<br>*** *** | Select a column: signing department | | |
| | | Column value | View | ...... |
| | | Unrestricted | | |
| | | Null | | |
| | | Sales department I | | |
| | | Sales department II | | |
| Select an authorization template<br>✓ Zhang San<br>Created template 1<br>Created template 2<br>...... | | Sales department III | ✓ | |
| | | *** | | |

FIG. 11

COLUMN VALUE-BASED SEPARATE AUTHORIZATION METHOD FOR STATISTICAL LIST OPERATIONS

CROSS-REFERENCE TO RELATED APPLICATIONS

This application is the U.S. national phase of PCT/CN2018/099066 filed on Aug. 6, 2018, which claims priority to Chinese Application No. 201710668290.0 filed on Aug. 7, 2017, the disclosures of which are incorporated by reference herein in their entireties.

BACKGROUND

Technical Field

The present invention relates to a method for authorizing a statistical list of management software such as ERP and CRM, and in particular, to a column value-based separate authorization method for statistical list operations.

Related Art

A statistical list is different from the concept of a form: (1) The authorization of a form mainly represents addition, deletion, modification, and viewing of data in a database or form, while the operations on a statistical list do not modify the data in the database or form but only query the data in the database in a desired manner; (2) a form represents a service object such as an order, a contract, a customer, or the like. Each entry of form data corresponds to a unique service object. For example, a customer 001 in the customer form represents a unique customer 001 (the customer 001 is a form data entry or object). However, a statistical list is generally statistics of one or more forms performed in a desired manner. A row of data in the statistical list is not a service object, but a statistical result. For example, statistics of sales contracts are based on signing department. Each row of statistical data represents the statistics of all sales contracts undertaken by a signing department, and may include statistics of the quantity of signed contracts, statistics of the amount of signed contracts, statistics of amount of received payments, statistics of the quantity of orders, and the like.

A general software system provides functions of displaying and viewing a statistical list. However, in a conventional software system, a grantee either can view statistical data corresponding to all column values in a column in the statistical list, or cannot view anything of the entire statistical list. Operation permissions on statistical data cannot be managed in a refined manner according to the column value, and the usage is greatly limited. For example, for a "Statistical list of sales contracts", column names in the statistical list include signing department, quantity of signed contracts, amount of signed contracts, amount of received payments, quantity of orders, and quantity of shipped products. The column values in the "signing department" column include sales department I, sales department II, sales department III, and so on. When statistical data of sales contracts of the entire sales department needs to be provided to a chief sales officer, the statistical list may be provided directly to the chief sales officer. If the statistical data of sales contracts of sales department II needs to be provided to the manager of the sales department II, the system can fulfill this purpose by creating a new statistical list specially for the sales department II (the same existing statistical list is not applicable), or by providing the entire statistical list. In the first manner of fulfilling such purpose, each column value involved in the statistical list may need to be stated in a specially created form (a new statistical list needs to be created for the sales department II), thereby bringing an inestimable workload. In the second manner, the statistical data of the sales department I and the sales department III will be leaked to the manager of the sales department II. The conventional method cannot meet the actual operation and usage requirements of enterprises and institutions.

In addition, the conventional authorization method cannot effectively authorize operations on statistical data with a null column value. The "null column value" means that the content of a column is null (blank or unselected). The usage is greatly limited. For example, when a new contract is added, the signing department is blank (because the "signing department" field may be non-mandatory), or the contract is attributed to a part-time salesperson of the company. In this case, it is impracticable to authorize operations for such statistical data through the column name "signing department". To authorize operations on such statistical data, it is necessary to authorize statistical data entries one by one, thereby bringing a huge workload and being error-prone.

Role-based access control (RBAC) is one of the most researched and matured permission management mechanisms for database in recent years. It is considered to be an ideal candidate to replace conventional mandatory access control (MAC) and discretionary access control (DAC). Conventional discretionary access control has high flexibility but low security. Mandatory access control is highly secure but too restrictive. Role-based access control combines both above, and not only is easy to manage, but also reduces complexity, costs, and probability of errors. Therefore, it has been greatly developed in recent years. The basic idea of role-based access control (RBAC) is to divide different roles according to different functional positions in an enterprise organization view, encapsulate an access permission of database resources in roles, and allow users to indirectly access the database resources by assigning different roles to the users.

A large number of tables and views are often built in large-scale application systems, which makes the management and permissions of database resources very complicated. It is very difficult for the user to directly manage the access and permissions of the database resources. It requires the user to have a very thorough understanding of the database structure and to be familiar with the use of the SQL language. Once the structures or security requirements of the application systems have changed, a large number of complex and cumbersome permission changes are required, and the security vulnerabilities caused by some unexpected authorization errors are very likely to occur. Therefore, designing a simple and efficient permission management method designed for large-scale application systems has become a common requirement for system and system users.

The role-based permission control mechanism can manage the access permissions of the system simply and efficiently, which greatly reduces the burden and cost of the system permission management, and makes the system permission management more compliant with the business management specifications of the application system.

However, the conventional role-based user permission management method adopts a "role-to-user one-to-many" relation mechanism, where the "role" is a group or class in nature, that is, one role can simultaneously correspond to/be relate to multiple users. The role is similar to a post/position/type of work or other concepts. The permissions authorized to a user under this relation mechanism are basically divided into the following three forms: 1, as shown in FIG. 1, the permissions are directly authorized to the user, where the disadvantage is that the workload is large and the operation is frequent and troublesome. When changes on the employee have occurred (such as transfer or resignation), all form operation permissions related to the employee shall be adjusted accordingly. Especially, for changes on an employee in a management position of an enterprise, many approval processes are involved, errors or omissions are likely to occur, affecting the normal operation of the enterprise and even causing unpredictable losses.

2. As shown in FIG. 2, the role (having the nature of a class/group/post/type of work) is authorized (one role can be related to multiple users), and the user obtains permission through its role; 3. As shown in FIG. 3, the above two methods are combined.

In the above descriptions, as both 2 and 3 need to authorize the role having the nature of a class/group, the way of authorization through the role in the nature of class/group/post/type of work has the following disadvantages: 1. when the user's permissions change, the operation is difficult: in the actual process of using a system, it is often necessary to adjust the user's permissions during the operation process. For example, when the employee's permission changes, the authority of an employee related to the role changes, we can't change the permissions of the entire role because of the change in the individual employee's permissions, because this role is also related to other employees whose permissions remain unchanged. So to cope with this situation, either create a new role to satisfy the employee whose permissions have changed, or directly authorize (disengaged from the role) from the employee based on the permission requirements. The above two processing methods not only require a long time for the role authorization in the case of a large number of role permissions, but also are easy to make mistakes, the user is cumbersome and troublesome to operate, and errors occur easily, resulting in loss to the system user.

When the approval permissions of the employee/user have changed, either the employee/user is disengaged from the role, or a new role is added to meet the requirements of work. The defect of the first way is the same as that of the foregoing method of "direct authorization to the user". In the second way, adding a new role involves creation, relation and authorization of the role. Especially when there are many roles and many users related to the roles, it is difficult to remember which users are related to the role.

2. It is difficult to remember the specific permissions contained in a role for a long time: If the role has many permission function points, it will be difficult to remember the specific permissions of the role, and it is even more difficult to remember the differences in permissions of roles with similar permissions. If a new user needs to be associated, it is impracticable to accurately determine how to select a role for relation.

3. Because user permissions change, more roles will be created (if you do not create a new role, it will greatly increase the authorization directly to the user), and it is more difficult to distinguish the specific differences between permissions of the roles.

4. When a user is transferred from a post, if many permissions of the transferred user need to be assigned to other users, separating the permissions of the transferred users and creating roles to relate to other users respectively are necessary. Such operations are not only complicated and time-consuming, but also prone to errors.

SUMMARY

Technical Problems

The objectives of the present invention are to overcome the disadvantages of the prior art, provide a column value-based separate authorization method for statistical list operations, control statistical data of a statistical list more meticulously, improve the fine-tuning of management, and meet usage requirements of enterprises and institutions in actual operations.

Solutions to Problems

Technical Solutions

The object of the present invention is achieved by the following technical solutions. A column value-based separate authorization method for statistical list operations, comprising a step of authorizing a statistical list operation and a step of selecting a grantee, where the order between the step of authorizing a statistical list operation and the step of selecting a grantee is not limited. The step of authorizing a statistical list operation includes the following steps: S1: selecting a statistical list needing authorization; S2: selecting a column needing authorization in the statistical list, wherein the selected column is a column determined by selection or determined automatically; and S3: authorizing an operation for statistical data corresponding to each of column values in the selected column, where in the step of selecting a grantee, one or more grantees are selected.

The authorized operation includes viewing. The determining by selecting or determining automatically in "the selected column is a column determined by selection or determined automatically" herein means that: The column value is determined by selection (for example, the column values in a "customer sector" column in a customer statistical list include manufacturing, finance, aviation, and other options. Such column values are not manually input, but are determined by selection. For another example, the column values in the columns such as "customer city", "department in charge of customer", "person in charge of customer", and "role in charge of customer" are also determined by selection) or determined automatically (for example, the column values in the columns such as "Creator", "Recorder", "Form preparation role", "Form preparation user", and "Form preparer" in the statistical list are automatically determined according to the relevant rules).

Statistical data corresponding to the column value not authorized for viewing is displayed in one or more of the following manners: (1) displaying the column value, but hiding the statistical data corresponding to the column value by using a hidden character; and (2) displaying neither the column value nor the statistical data corresponding to the column value.

When only one grantee is selected and when the statistical list needing authorization and the column needing authorization in the statistical list are selected, status of a permission previously authorized for the grantee to operate statistical data corresponding to each column value in the column in the statistical list is displayed.

When two or more grantees are selected and when the statistical list needing authorization and the column needing authorization in the statistical list are selected, status of a permission authorized for the grantee to operate statistical data corresponding to each column value in the column in the statistical list is not displayed.

When only one grantee is selected and when the statistical list needing authorization and the column needing authorization in the statistical list are selected, an operator who last authorizes the column in the statistical list for the grantee and time of such authorization is displayed.

The grantee is one or more roles, each of roles is an independent individual not a group/class, and during the same period, only one role can be related to a unique user, while one user is related to one or more roles.

The column value-based separate authorization method for statistical list operations further comprising a step of authorizing a template, specifically including: (1) selecting a grantee, a statistical list needing authorization, and a column needing authorization: selecting one or more grantees, selecting one statistical list needing authorization, and from the selected statistical list, wherein selecting a column needing authorization; (2) authorizing the grantee: selecting an existing authorized grantee or a created template as an authorization template, and granting an operation permission for statistical data corresponding to each column value in the column in the statistical list of the authorization template to the grantee; and (3) performing a save operation after modification or no modification to obtain the operation permission for the grantee to operate the statistical data corresponding to each column value in the column in the statistical list.

A column value-based separate authorization method for statistical list operations, said method comprising a step of authorizing a statistical list operation and a step of selecting a grantee, where the order between the step of authorizing a statistical list operation and the step of selecting a grantee is not limited. The step of authorizing a statistical list operation comprises the following steps: S1: selecting a statistical list needing authorization; S2: selecting a column needing authorization in the statistical list, wherein the selected column is a column determined by selection or determined automatically; and S3: authorizing an operation according to statistical data corresponding to each of column values in the selected column, wherein the authorization process comprises a step of authorizing an operation for statistical data as a whole corresponding to a null column value in the selected column.

A column value-based separate authorization method for statistical list operations, said method comprising a step of authorizing a statistical list operation and a step of selecting a grantee, wherein the order between the step of authorizing a statistical list operation and the step of selecting a grantee is not limited. The step of authorizing a statistical list operation comprises the following steps: S1: selecting a statistical list needing authorization; S2: selecting a column needing authorization in the statistical list, wherein the selected column is a column determined by selection or determined automatically; and S3: authorizing an operation according to statistical data corresponding to each of column values in the selected column, wherein the authorization process comprises a step of authorizing an operation for statistical data as a whole corresponding to all column values in the selected column, and such all column values include a null column value.

Beneficial Effects of the Invention

Beneficial Effects

Beneficial effects of the present invention are: 1) The present invention enables separate authorization of the operation permissions for the statistical data in the statistical list according to the column values, one statistical list can meet different actual usage requirements after the authorization of different statistical data operation permissions, thereby controlling the statistical data of statistical list more meticulously, greatly improving the fine-tuning of management, and meeting the usage requirements of enterprises and institutions in actual operations.

For example, for a "Statistical list of sales contracts", column names in the statistical list include signing department, quantity of signed contracts, amount of signed contracts, amount of received payments, quantity of orders, and quantity of shipped products. The column values in "signing department" column include sales department I, sales department II, sales department III, and so on. If sales contracts statistical data of the entire sales department needs to be provided to a chief sales officer, the chief sales officer may be selected as a grantee and set to: have a permission to view the statistical data in the "signing department" column in which the column value is sales department I, sales department II, sales department III, and the like. If the statistical data of sales contracts of only sales department II needs to be provided to the manager of sales department II, the manager of sales department II may be selected as a grantee and set to: have a permission to view the statistical data in the "signing department" column in which the column value is sales department II.

2) When one grantee is selected and when the statistical list needing authorization and the column needing authorization in the statistical list are selected, an operator who last authorizes the column in the statistical list for the grantee and time of such authorization may be displayed. By displaying the last operator, authorization errors are more traceable and accountable. By displaying the last operation time, it is more convenient to intuitively determine whether the operation on the column of the statistical list needs to be re-authorized.

For example, at 11:00 on May 21, 2015, Li Si last authorized a grantee Zhang San to view the statistical data of "Statistical list of sales contracts" and "signing department". When the selected grantee is Zhang San, the statistical list selected for authorization is "sales results statistical list", and the column selected for authorization is "signing department", an authorizer can see that at 11:00 on May 21, 2015, Li Si last authorized Zhang San to view the "signing department" in the "sales results statistical list".

If Zhang San is not entitled to view the statistical data of sales contracts of the sales department IV but the last authorization enables Zhang San to view the statistical data of sales contracts of the sales department IV, the last authorizer can be searched out as a responsibility taker in the subsequent process of investigating responsibility.

For another example, an authorizer needs to authorize 100 grantees to operate a statistical list, but completes the authorization operations for only 70 grantees in a day. When the authorizer continues to perform authorization operations the next day, the authorizer may determine, by checking the time at which each grantee was last authorized, whether the grantee needs to be authorized. The authorizer may also designate an authorization time interval, and search out all grantees who are authorized in the designated time interval. By checking the last time of authorizing the grantee, the authorizer can find how long the permission of the grantee has remained unchanged, thereby helping to intuitively determine whether the grantee needs to be re-authorized.

3) This method enables selection of multiple grantees simultaneously for being authorized in batches, thereby improving authorization efficiency. In addition, the method supports template authorization. That is, an existing authorized grantee or a created template is selected as an authorization template. The permissions to operate the column in the statistical list of the authorization template are directly granted to (updated for) the grantee (and saved after being simply modified). The authorization operation is simple and efficient. By combining the two manners, efficiency of authorizing operations for the statistical list in the system is improved greatly.

4) The present invention enables effective uniform authorization for the statistical data in a column in which a column value is null. The authorization operation is convenient, and the authorization workload is small. The "column value is null" means that the content in the column is null (not filled or not selected). For example, the signing department is left blank when a new contract is added (because the signing department may be a non-mandatory field, and the contract can be submitted without selection of such field), or the contract is attributed to a part-time salesperson of the company. In this case, it is impracticable to authorize operations for such statistical data through the column name "signing department". Such data is classified as data whose column value in the "signing department" column is null. By selecting the "null" option, operations on the statistical results of such data are authorized uniformly, thereby facilitating authorization operations.

5) The present invention enables authorization of operations on the statistical data of all column values in the selected column as a whole. The authorization operation is simple and efficient, and is particularly suitable when the statistical data operation permission is the same for all column values in a column. For example, regardless of the column value in the "signing department" column, the statistical data operation permission is the same and unrestricted. In this case, the authorizer may directly select the "unrestricted" option under this operation permission, indicating that the statistical data corresponding to all column values is controlled by this operation permission. The setting of the "unrestricted" function brings two additional advantages: First, the "unrestricted" option may be selected for authorizing company officers who own all permissions. Secondly, once the "unrestricted" option is selected, even if more column values are added in the future, the permissions of the grantee remain unaffected (unrestricted) due to the selection of "unrestricted").

6) In the present invention, the grantee may have a role of an independent individual nature. When an employee is resigned or transferred from a post, the operation permissions for statistical list are handed over and updated simply by creating or canceling a relation between the user and role, thereby achieving seamless handover of the operation permissions, ensuring timely update of the user's operation permissions for the statistical list, avoiding hysteresis or omission of update of the operation permissions, avoiding impact on the normal operation of the enterprise, and avoiding the risk of leaking confidential information.

Resignation example: The user corresponding to an employee Zhang San is related to a role "production worker 1". When Zhang San is resigned, the system administrator (or the corresponding administrator) directly cancels the relation between the user corresponding to Zhang San and the role "production worker 1". Therefore, Zhang San automatically loses the statistical list operation permissions corresponding to "production worker 1", thereby avoiding hysteresis of handover of the statistical list operation permissions, and preventing relevant confidential information from being leaked to Zhang San in the case that Zhang San still has the permission to view certain confidential information after resignation due to the hysteresis. When a new employee Li Si takes over Zhang San's work, the user corresponding to Li Si is directly related to "production worker 1". In this way, Li Si automatically obtains the statistical list operation permissions corresponding to the role "production worker 1", and it is not necessary to set the statistical list operation permissions for Li Si again, thereby simplifying and quickening the operations and greatly reducing the workload.

Job transfer example: An employee Zhang San needs to be transferred from Production department to After-sales department. The system administrator (or the corresponding administrator) cancels the relation between user corresponding to Zhang San and the original role "production worker 1", and relates Zhang San to a new role "after-sales staff 3" of after-sales department, so that Zhang San automatically obtains the statistical list operation permissions corresponding to the role "after-sales staff 3".

7) In the present application, the role is in one-to-one relation to the user. One role can only be related to a unique user during the same period, and one user is related to one or more roles. The advantage thereof is that permissions can be obtained as long as the user is related to the role (that is, the user obtains the permissions of its related role), and changes permissions of the role are much fewer than the changes of the user's permissions in a conventional mechanism. As there are few changes of the quantity of roles having the nature of an independent individual in nature (the nature of a post number/a work station number), Although there is large employee turnover, few changes occur in the post number/work station number (even if there is no change in a certain period, that is, the role does not change). This greatly simplifies user's permission management and reduces system overheads.

8) The operations such as dynamic management, recruitment, and transfer are simple, convenient, efficient and highly reliable. The application of recruitment/resignation/transfer in the approval process is simple. When an employee/a user has changed, it is unnecessary to reset permissions. It is only necessary for a user to cancel the relation to the role or be related to the role. For the user who is no longer in the role, the relation to the role is canceled, and the user who takes over the role is related to the role of the post number. The user related to the role automatically obtains the statistical list operation permission of that role, without re-authorizing the role, thus greatly improving the efficiency, security, and reliability of the system setting.

For example, because a user Zhang San is transferred or resigns from a post, Zhang San no longer works as the role of "purchaser 3", and Zhang San then cancels the relation to the role of "purchaser 3". Meanwhile, Li Si takes over the work as the role of "purchaser 3", and it only needs to relate Li Si to the role, so Li Si automatically obtains the statistical list operation permission of the role of "purchaser 3".

9) The conventional permission management mechanism defines the role as the nature of a group, a type of work, a class or the like. The role is in a one-to-many relation to the user. In the actual process of using a system, the user's permissions often need to be adjusted during the operation process. For example, in processing the change of an employee's permissions, when the permissions of the employee related to the role have changed, it is improper to change the permissions of the entire role due to the change in the permissions of the individual employee, because this role is also related to other employees whose permissions remain unchanged. To cope with this situation, either a new role is created to fit the employee whose permissions have changed, or permissions are directly authorized to the employee (disengaged from the role) based on permission requirements. The above two processing methods not only take a long time but also cause mistakes easily during the role authorization in the case of a large number of role permissions. It is cumbersome for a user to operate, and errors occur easily, resulting in loss to the system user.

However, under the method of the present application, as the role is an independent individual, the object can be achieved by changing the permissions of the role. Although the method of the present application seems to increase the workload during system initialization, by means of copying or the like, the role can be created or authorized more efficiently than the conventional roles having the nature of a group. As it is unnecessary to consider the commonality of the roles having the nature of a group when satisfying the related users, the solutions in the present application make the permission setting clear and explicit. Especially after the system has been used for a period of time (the permissions of the user/role have changed dynamically), the solutions in the present application can significantly improve the permission management efficiency for the system user when using the system, make the dynamic authorization simpler, more convenient, clearer and more explicit, and improve the efficiency and reliability of the permission setting.

10) The conventional role authorization method with the nature of a group is prone to errors. The method provided in the present application significantly reduces the probability of authorization errors, because the method of the present application only needs to consider the role as an independent individual, without considering the commonalities of multiple users related to the role having the nature of a group under the conventional method. Even if the authorization errors occur, only the user related to the role is affected. However, in the case of the conventional role having the nature of a group, all users related to the role will be affected. Even if the authorization errors occur, the correction method of the present application is simple and takes a short time, while in the case of the conventional role having the nature of a group, the commonality of the permissions of all users related to the role needs to be considered during the error correction. The modification is cumbersome, complex, and error-prone when there are many function points, and in many cases, the problem cannot be solved unless a new role is created.

11) In the conventional group-based role authorization method, if the role has many permission function points, as time goes by, it is difficult to remember the specific permissions of the role, and it is even more difficult to remember the permission of roles with similar permissions. If a new user needs to be related, it cannot be accurately determined how to select a relation. In the method of the present application, the role itself has the nature of a post number/a station number, such that the selection can be made easily.

12) When a user is transferred from a post, if many permissions of the transferred user need to be assigned to other users, in processing, it is necessary to distinguish permissions of the transferred user and then create roles to be related to other users respectively. The operations are complicated, time-consuming, and prone to errors.

The method of the present application is as follows: The transferred user is related to several roles. When the user is transferred, the relation of the user to the roles in the original department is first canceled (the canceled roles may be re-related to other users), and then the user is related to a role in a new department. The operation is simple and not error-prone.

BRIEF DESCRIPTION OF THE DRAWINGS

Description of Drawings

Figure 1:
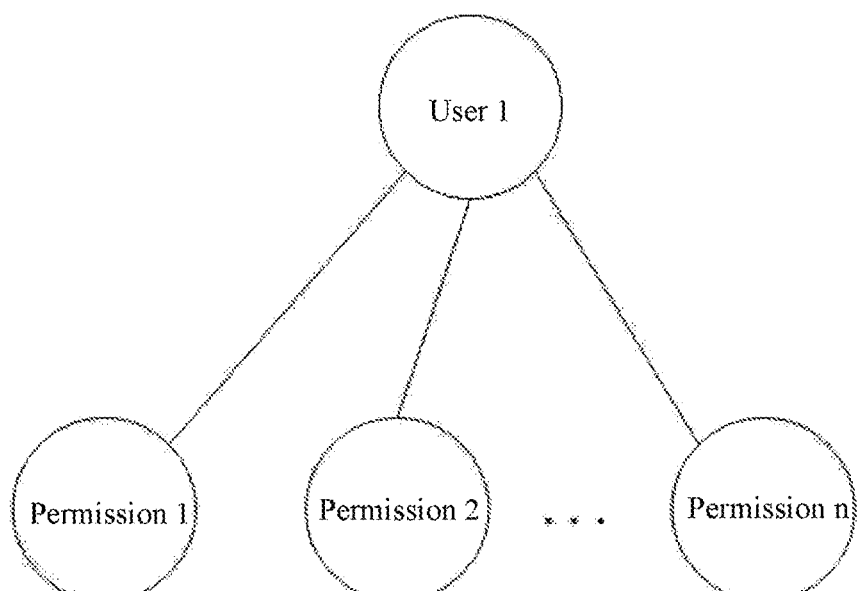
Figure 2:
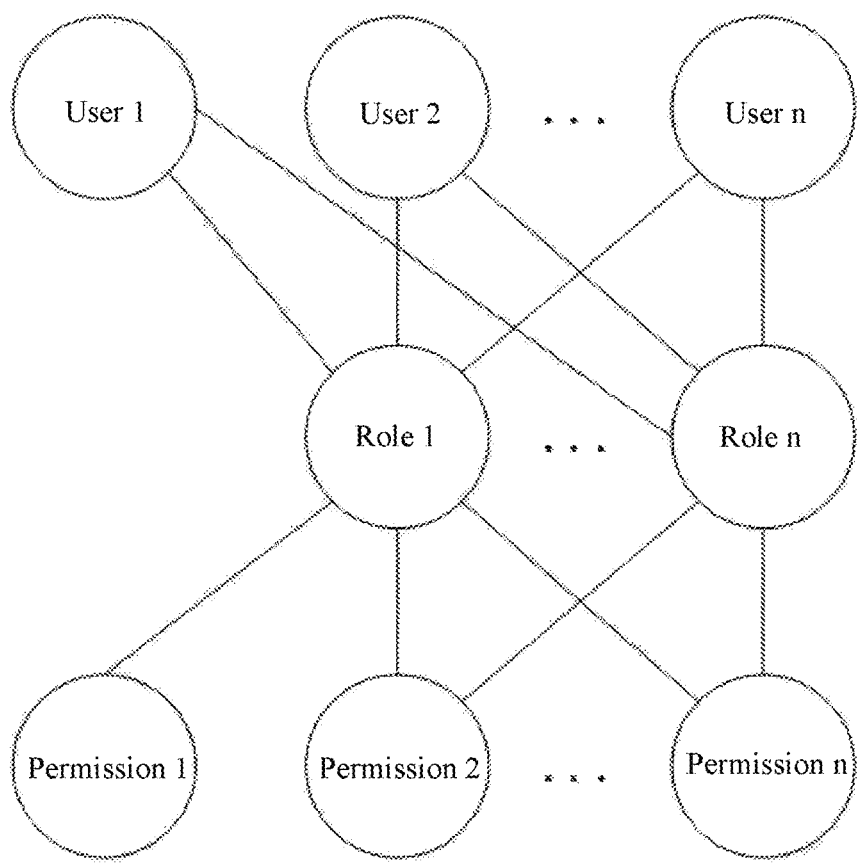
Figure 3:
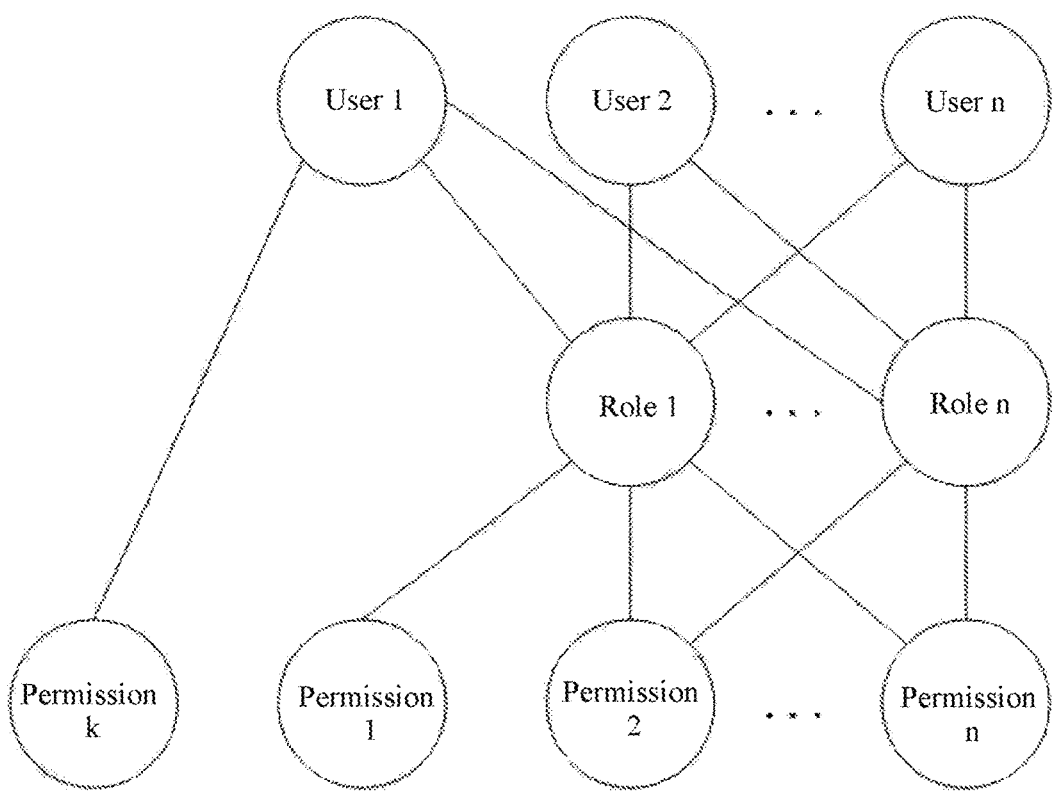
Figures 4, 5:
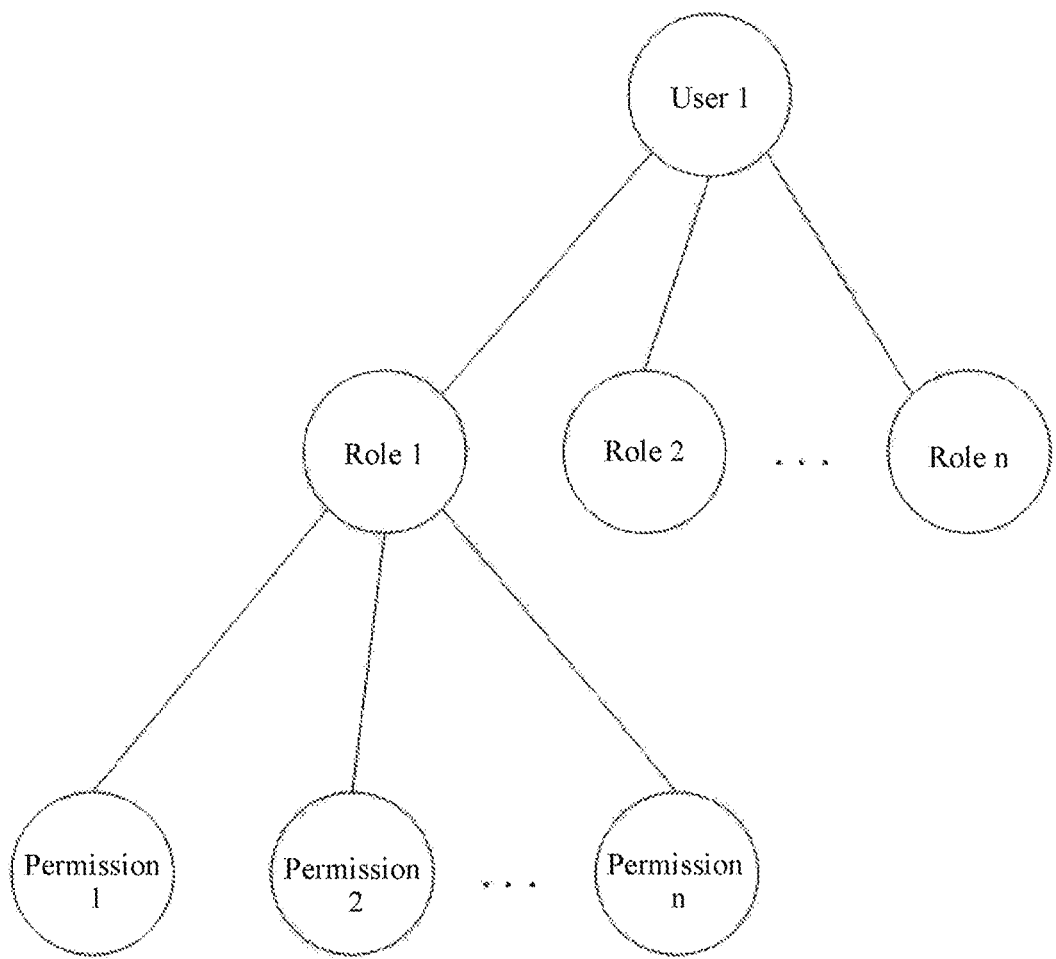

FIG. 1 is a schematic diagram in which a system directly authorizes a user in the prior art;

FIG. 2 is a schematic diagram in which a system authorizes a role having the nature of a group/class in the prior art;

FIG. 3 is a schematic diagram in which a system both directly authorizes a user and authorizes a role having the nature of a group/class in the prior art;

FIG. 4 is a schematic diagram in which a system authorizes a user through a role having the nature of an independent individual according to the present invention;

FIG. 5 is a schematic diagram in a case that one grantee is selected and a statistical list and a column are selected according to the present invention;

FIG. 6 is a schematic diagram of a way of displaying a statistical list of sales contracts according to the present invention;

FIG. 7 is a schematic diagram of another way of displaying a statistical list of sales contracts according to the present invention;

FIG. 8 is a schematic diagram of status of authorizing Li Er to operate statistical data corresponding to each column value in a column whose column name is signing department in a statistical list of sales contracts;

FIG. 9 is a schematic diagram in a case that multiple grantees are selected and a statistical list and a column are selected according to the present invention;

FIG. 10 is a schematic diagram of displaying a grantee who last performs an authorization operation and time of such operation according to the present invention; and FIG. 11 is a schematic diagram of using an authorization template to authorize a grantee according to the present invention.

DETAILED DESCRIPTION

The following describes technical solutions of the present invention in further detail with reference to accompanying drawings, but the protection scope of the present invention is not limited to the following.

Embodiment 1

A column value-based separate authorization method for statistical list operations, comprising a step of authorizing a statistical list operation and a step of selecting a grantee, where the order between the step of authorizing a statistical list operation and the step of selecting a grantee is not limited. The authorized operation is viewing.

The step of authorizing a statistical list operations, comprising the following steps: S1: selecting a statistical list needing authorization; S2: selecting a column needing authorization in the statistical list, wherein the column value in the selected column is determined by selection (for example, the column values in a column named "customer sector" in a customer statistical list include manufacturing, finance, aviation, and other options. Such column values are not manually input, but are determined by selection. For another example, the column values in the columns such as "customer city", "department in charge of customer", and the like are also determined by selection) or determined automatically (for example, the column values in the columns named "creator", "recorder", "form preparation role", "form preparer", and the like in the statistical list are automatically determined according to relevant rules); and S3: authorizing an operation for statistical data corresponding to each of column values in the selected column, wherein in the step of selecting a grantee, one or more grantees are selected. The grantee may be an employee, a user, a role having a group/class in nature, a role having an independent individual nature, or the like.

This embodiment enables separate authorization of the operation permissions for statistical data in the statistical list according to the column values. One statistical list can meet different actual usage requirements after the authorization of different statistical data operation permissions, thereby controlling the statistical data of the statistical list more meticulously, greatly improving the fine-tuning of management, and meeting the usage requirements of enterprises and institutions in actual operations.

For example, for a "Statistical list of sales contracts", column names in the statistical list include signing department, quantity of signed contracts, amount of signed contracts, amount of received payments, quantity of orders, and quantity of shipped products. The column values in the column named "signing department" include sales department I, sales department II, and sales department III. If sales contracts statistical data of entire sales department needs to be provided to a chief sales officer Zhang San, Zhang San may be selected as a grantee, "statistical list of sales contracts" may be selected as a statistical list, and "signing department" may be selected as a column name, and the grantee is set to: have a permission to view the statistical data in the column in which the column value is sales department I, sales department II, and sales department III.

As shown in FIG. 5, if sales contracts statistical data of only sales department II needs to be provided to the manager of sales department II, the manager Li Er of sales department II may be selected as a grantee, "statistical list of sales contracts" may be selected as a statistical list, and "signing department" may be selected as a column name, and the grantee is set to: have a permission to view the statistical data in the column in which the column value is sales department II.

In this embodiment, statistical data corresponding to a column value not authorized for viewing is displayed in one or more of the following manners: (1) as shown in FIG. 6, displaying the column value, but hiding the statistical data corresponding to the column value by using a hidden character; and (2) as shown in FIG. 7, neither the column value nor the statistical data corresponding to the column value is displayed ("neither is displayed" may also be expressed as "none is displayed". For example, in FIG. 7, none of the statistical data identified by " . . . " is displayed. That is, the row is not displayed or disappears).

Embodiment 2

When only one grantee is selected and when the statistical list needing authorization and the column needing authorization in the statistical list are selected, status of a permission previously authorized for the grantee to operate statistical data corresponding to each column value in the column in the statistical list is displayed (as shown in FIG. 8, Li Er is previously authorized to view the statistical data corresponding to the column values "sales department I", "sales department II", and "sales department III" in the column named "signing department" of "statistical list of sales contracts").

Embodiment 3

When two or more grantees are selected and when the statistical list needing authorization and the column needing authorization in the statistical list are selected, status of a permission authorized for the grantee to operate statistical data corresponding to each column value in the column in the statistical list is not displayed (as shown in FIG. 9).

Embodiment 4

As shown in FIG. 10, when only one grantee is selected and when the statistical list needing authorization and the column needing authorization in the statistical list are selected, an operator who last authorizes the column in the statistical list for the grantee and time of such authorization are displayed.

By displaying the last operator, authorization errors are more traceable and accountable. By displaying the last operation time, it is more convenient to intuitively determine whether the operation on the column of the statistical list needs to be re-authorized.

For example, at 11:00 on May 21, 2015, Li Si last authorized a grantee Zhang San to view the statistical data of "Statistical list of sales contracts" and "signing department". When the selected grantee is Zhang San, the statistical list selected for authorization is "sales results statistical list", and the column selected for authorization is "signing department", an authorizer can see that at 11:00 on May 21, 2015, Li Si last authorized Zhang San to view the "signing department" in the "sales results statistical list".

If Zhang San is not entitled to view the statistical data of sales contracts of the sales department IV but the last authorization enables Zhang San to view the statistical data of sales contracts of the sales department IV, the last authorizer can be searched out as a responsibility taker in the subsequent process of investigating responsibility.

For another example, an authorizer needs to authorize 100 grantees to operate a statistical list, but completes the authorization operations for only 70 grantees in a day. When the authorizer continues to perform authorization operations the next day, the authorizer may determine, by checking the time at which each grantee was last authorized, whether the grantee needs to be authorized. The authorizer may also designate an authorization time interval, and search out all grantees who are authorized in the designated time interval. By checking the last time of authorizing the grantee, the authorizer can find how long the permission of the grantee has remained unchanged, thereby helping to intuitively determine whether the grantee needs to be re-authorized.

Embodiment 5

The column value-based separate authorization method for statistical list operations further comprising a step of authorizing a template, specifically including: (1) selecting a grantee, a statistical list needing authorization, and a column needing authorization: selecting one or more grantees, selecting one statistical list needing authorization, and from the selected statistical list, selecting a column needing authorization; (2) authorizing the grantee: selecting an existing authorized grantee or a created template as an authorization template, and granting an operation permission for statistical data corresponding to each column value in the column in the statistical list of the authorization template to the grantee; and (3) performing a save operation after modification or no modification to obtain the operation permission for the grantee to operate the statistical data corresponding to each column value in the column in the statistical list.

For example, as shown in FIG. 11, Zhang San's operation permissions for the statistical data corresponding to each column value in the "signing department" column in the statistical list of sales contracts are used as an authorization template for authorizing Li Er.

This method enables selection of multiple grantees simultaneously for being authorized in batches, thereby improving authorization efficiency. In addition, the method supports template authorization. That is, an existing authorized grantee or a created template is selected as an authorization template. The permissions to operate the column in the statistical list of the authorization template are directly granted to (updated for) the grantee (and saved after being simply modified). The authorization operation is simple and efficient. By combining the two manners, efficiency of authorizing operations for the statistical list in the system is improved greatly.

Embodiment 6

A column value-based separate authorization method for statistical list operations, comprising a step of authorizing a statistical list operation and a step of selecting a grantee, wherein the order between the step of authorizing a statistical list operation and the step of selecting a grantee is not limited. The step of authorizing a statistical list operation includes the following steps: S1: selecting a statistical list needing authorization; S2: selecting a column needing authorization in the statistical list, wherein the selected column is a column determined by selection or determined automatically; and S3: authorizing an operation according to statistical data corresponding to each of column values in the selected column, wherein the authorization process comprising a step of authorizing an operation for statistical data as a whole corresponding to a null column value in the selected column.

In the step of selecting a grantee, one or more grantees are selected. The grantee may be an employee, a user, a role having a group/class nature, a role having an independent individual nature, or the like.

As shown in FIG. 5, FIG. 8 to FIG. 11, the present invention enables effective uniform authorization for the statistical data in a column in which a column value is null. The authorization operation is convenient, and the authorization workload is small. The "column value is null" means that the content in the column is null (not filled or not selected). For example, the signing department is left blank when a new contract is added (because the signing department may be a non-mandatory field, and the contract can be submitted without selection of such field), or the contract is attributed to a part-time salesperson of the company. In this case, it is impracticable to authorize operations for such statistical data through the column name "signing department". Such data is classified as data whose column value in the "signing department" is null, by selecting the "null" option, operations on the statistical results of such data are authorized uniformly, thereby facilitating authorization operations.

Embodiment 7

A column value-based separate authorization method for statistical list operations, comprising a step of authorizing a statistical list operation and a step of selecting a grantee, wherein the order between the step of authorizing a statistical list operation and the step of selecting a grantee is not limited. The step of authorizing a statistical list operation includes the following steps: S1: selecting a statistical list needing authorization; S2: selecting a column needing authorization in the statistical list, wherein the selected column is a column determined by selection or determined automatically; and S3: authorizing an operation according to statistical data corresponding to each of column values in the selected column, wherein the authorization process comprising a step of authorizing an operation for statistical data as a whole corresponding to all column values in the selected column, and such all column values include a null column value.

In the step of selecting a grantee, one or more grantees are selected. The grantee may be an employee, a user, a role having a group/class nature, a role having an independent individual nature, or the like.

As shown in FIG. 5, FIG. 8 to FIG. 11, the present invention enables authorization of operations on the statistical data of all column values in the selected column as a whole. The authorization operation is simple and efficient, and is particularly suitable when the statistical data operation permission is the same for all column values in a column. For example, regardless of the column value in the "signing department" column, the statistical data operation permission is the same and unrestricted. In this case, the authorizer may directly select the "unrestricted" option under this operation permission, indicating that the statistical data corresponding to all column values is controlled by this operation permission. The setting of the "unrestricted" function brings two additional advantages: First, the "unrestricted" option may be selected for authorizing company officers (such as a chief sales officer) who own all permissions. Secondly, once the "unrestricted" option is selected, even if more column values are added in the future, the permissions of the grantee remain unaffected (that is, operations on the statistical data corresponding to an added column value are also authorized) due to the selection of "unrestricted").

Embodiment 8

A column value-based separate authorization method for statistical list operations, comprising a step of authorizing a statistical list operation and a step of selecting a grantee. The step of authorizing a statistical list operation includes the following steps: S1: selecting a statistical list needing authorization; S2: selecting a column needing authorization in the statistical list, wherein the selected column is a column determined by selection or determined automatically; and S3: authorizing an operation for statistical data corresponding to each of column values in the selected column, wherein in the step of selecting a grantee, one or more grantees are selected, and the grantee is one or more roles. As shown in FIG. 4, the role is an independent individual not a group/class. During the same period, one role can only be related to a unique user, while one user is related to one role or more roles. Each role is authorized according to work content of the role, and the user obtains the permissions of the role related to the user.

In this embodiment, the grantee has a role of an independent individual nature. When an employee is resigned or transferred from a post, the operation permissions for the statistical list are handed over and updated simply by creating or canceling a relation between the user and role, thereby achieving seamless handover of the operation permissions, ensuring timely update of the user's operation permissions for the statistical list, avoiding hysteresis or omission of update of the operation permissions, avoiding impact on the normal operation of the enterprise, and avoiding the risk of leaking confidential information.

Resignation example: The user corresponding to an employee Zhang San is related to a role of "production worker 1". When Zhang San is resigned, the system administrator (or the corresponding administrator) directly cancels the relation between the user corresponding to Zhang San and the role of "production worker 1". Therefore, Zhang San automatically loses from the statistical list operation permissions corresponding to the role of "production worker 1", thereby avoiding hysteresis of handover of the statistical list operation permissions, and preventing relevant confidential information from being leaked to Zhang San in the case that Zhang San still has the permission to view certain confidential information after resignation due to the hysteresis. When a new employee Li Si takes over Zhang San's work, the user corresponding to Li Si is directly related to "production worker 1". In this way, Li Si automatically obtains the statistical list operation permissions corresponding to the role of "production worker 1", and it is not necessary to set the statistical list operation permissions for Li Si again, thereby simplifying and quickening the operations and greatly reducing the workload.

Job transfer example: An employee Zhang San needs to be transferred from the production department to the after-sales department. The system administrator (or the corresponding administrator) cancels the relation between the user corresponding to Zhang San and the original role of "production worker 1", and relates Zhang San to a new role of "after-sales staff 3" of after-sales department, so that Zhang San automatically obtains the statistical list operation permissions corresponding to the role "after-sales staff 3".

Further, if a department is selected for a role when or after the role is created, the role belongs to the department, the role is authorized according to the work content of the role, the name of the role is unique in the department, and the number of the role is unique in the system. When said user is transferred from a post, the user's relation to an original role is canceled, and the user is related to a new role.

If the user needs to be transferred from a post, the method further comprising a step of managing user transfer, specifically including: (1) canceling a relation between the user and an original role; and (2) relating the user to a new role to which the user is transferred, whereby the user automatically obtains statistical list operation permissions of the new role.

In the following, the advantages of the method for authorizing the user by using the role having the nature of an independent individual are analyzed: The user determines (obtains) permissions through its relation to the role. If the permissions of the user need to be modified, the permissions owned by the role are adjusted to achieve the purpose of changing the permissions of the user related to the role. Once the user is related to the role, the user owns the statistical list operation permission of the role.

A role is in a one-to-one relation to a user (when the role is related to a user, other users can no longer be related to the role; and if the role is not related to the user, the role can be related to other users). A user's relation to a role is one-to-many (one user can be related to multiple roles at the same time).

Definition of a role: A role does not have the nature of a group/a class/a category/a post/a position/a type of work or the like, but has a non-collective nature. The role is unique and is an independent individual. Applied in an enterprise or an institution, the role is equivalent to a post number (the post number herein is not a post, and one post may have multiple employees at the same time, but one post number can only correspond to one employee during the same period).

For example, in a company system, the following roles may be created: a general manager, a deputy general manager 1, a deputy general manager 2, a manager of Beijing sales department I, a manager of Beijing sales department II, a manager of Beijing sales department III, a Shanghai sales engineer 1, a Shanghai sales engineer 2, a Shanghai sales engineer 3, a Shanghai sales engineer 4, a Shanghai sales engineer 5, and so on. The relation of users to roles is as follows: if Zhang San, the company's employee, serves as a deputy general manager 2 of the company and also serves as a manager of Beijing sales department I, the roles to which Zhang San needs to be related are the deputy general manager 2 and the manager of Beijing sales department I, and Zhang San owns the permissions of the two roles.

The concept of conventional roles is a group/a class/a post/a position/a type of work in nature, and one role can correspond to multiple users. However, in the present application, the concept of "role" is equivalent to a post number/ work station number, and is also similar to the role in a film and television drama: one role in the same period (in childhood, juvenile, middle-age . . . ) can be played by only one actor or actress, but one actor or actress may play multiple roles respectively.

After the role is created, a user may be related to the role in the process of creating the user, or may be related to the role at any time after the user is created. After the user is related to the role, the user can be released from the relation to the role at any time, and the relation of the user to another role may be created at any time.

The said system role is composed of: a post name+a post number. For example: roles of a workshop worker 1, a workshop worker 2, a workshop worker 3, and the like each are an independent individual which is independent individuals, equivalent to the concept of a post number and a work station number, but is different from the role in the conventional permission management system. The concept of a role in the conventional rights management system is of a group or class nature such as a post, a position, a type of work or the like.

The following example shows the relationship between employees, users and roles after the employee Zhang San enters a company: 1. Recruiting: after the employee is recruited, it can be done that he directly is related the role of the corresponding post number/station number for the user (employee), for example: Zhang San has joined the company (the company has assigned a user for Zhang San), the work content is responsible for the sale of refrigerator products in Beijing area, in the sale department I, (the corresponding role is the role of "Sale Engineer 5" in the sale department I), then user Zhang Sans directly select the role of "Sale Engineer 5" and the relation can be done.

2. Adding position: After Zhang San has worked for a period of time, the company will further arrange Zhang San to be responsible for the sale of TV products in Beijing area (a corresponding role is "sale engineer 8" under sale department I) and to also serve as a supervisor of an after-sale department (a corresponding role is "after-sale department supervisor 1). In this case, two roles, that is, "sale engineer 8" under sale department I and "after-sale department supervisor 1" under the after-sale department, are additionally related to the user Zhang San. In this case, the employee Zhang San is related to three roles: "sale engineer 5" and "sale engineer 8" under sale department I, and "after-sale department supervisor 1" under the after-sale department. Therefore, the user Zhang San has permissions of the three roles.

3. Reducing position: After a while, the company decided to let Zhang San serve as the post-sale manager (corresponding to a role "after-sale manager" under the after-sale department) and no longer take up other post. Then user Zhang San is related to the role of "after-sale manager" in the after-sale department 1, and cancels the three roles previously related ("sale engineer 5" and "sale engineer 8" under sale department I, and "after-sale department supervisor 1" under the sale department) at the same time. In this case, the user Zhang San only has the authority of the role of "after-sales manager" under the after-sales department.

4. Adjustment of permission of role (for the adjustment of the permissions of the role itself): If the company decides to add permission to the after-sale department manager, the permission only need to be added to the role of the after-sale department manager. With the increase in the permission of the role of the after-sale department manager, the permission of the user Zhang San are also increased.

5. Resigning: After one year, Zhang San resigns, it is only necessary to cancel the relationship of the user Zhang San to the role "after-sales manager" under after-sales department.

For example, during dynamic operation of the company, recruiting and resigning of staff often occur continuously, but post numbers or work station numbers seldom change (or even remain unchanged within a period of time).

In the conventional authorization method: in the case of a large number of system functions points, not only the authorization workload is large, complicated, but also easy to make mistakes, in the authorization with the conventional group/class role. Even if it is wrong, it is not easy to find in a short time. It is easy to cause damage to the system user.

In the authorization method according to the present application, the role in the nature of a post number or work station number nature are authorized in the present application, and the users are related to the roles so that permissions of the users are determined. Therefore, the permission of the users are controlled merely through a simple user-role relation. Such that the permission control is in a simple, easy to operate, clear, and explicit, thereby significantly improving efficiency and reliability of authorization.

The above is only a preferred embodiment of the present invention. It should be understood that the present invention is not limited to the forms disclosed herein, and is not to be construed as the exclusion to the other embodiments, but may be used in various other combinations, modifications and environments. Modifications can be made according to the techniques or knowledge of the above teachings or related art within conceptive scope herein. All changes and modifications made by those skilled in the art are intended to be within the scope of the appended claims.

What is claimed is:

1. A method of controlling authorization to view statistical data comprised by a statistical list, the method comprising:
providing one or more datasets from which the statistical list is generated,
the statistical list comprising a plurality of rows of data, each row having a plurality of fields;
the statistical list further comprising a plurality of columns, each column including one of the plurality of fields from each of the plurality of rows;
wherein one of the columns is a specified column to be selected;
wherein the specified column includes a plurality of distinct column values within the respective one of the plurality of fields;
authorizing a grantee to view statistical data corresponding to one or more of the plurality of the distinct column values in the specified column,
providing one or more statistical operations that operate on the one or more datasets to generate the statistical list and the corresponding statistical data;
executing the one or more statistical operations to generate the statistical list including only the corresponding statistical data;
the statistical data comprising:
a plurality of rows of data, the plurality of rows of data count equal to a count number of the plurality of distinct column values, each row having only a plurality of fields and another field for one of the plurality of distinct column values;
a plurality of columns, each column including one of the plurality of fields from each of the plurality of rows;
wherein each of the plurality of rows is specific to only one of the plurality of distinct column values; and
wherein each corresponding plurality of fields of the each of the plurality of rows comprises a statistical results value corresponding to the corresponding specific only one of the plurality of distinct column values;
wherein the authorization of the grantee comprises:
displaying a template comprising:
a grantee column having a plurality of selectable grantees,
a statistical list column having a plurality of selectable statistical lists,
the template configured to allow only one of the plurality of selectable statistical lists to be selected, and
an authorization portion comprising:
a plurality of rows, each row corresponding to only one of the plurality of distinct column values,
wherein each row comprises:
a first field having a value of the only one of the plurality of distinct column values, and
at least one selectable permission associated with the first field value;
editing the template to generate selections comprising:
selecting the grantee from the grantee column,
selecting the statistical list from the statistical list column, and
for at least one of the plurality of rows of the authorization portion,
selecting at least one of the at least one selectable permission; and
storing the generated selections as the stored template;
in response to a request from the grantee, displaying one or more of the rows of the statistical data according to the stored template comprising:
for each of the rows of the statistical data;
retrieving the corresponding only one of the plurality of distinct column values from the each row;
retrieving from the stored template a corresponding first field and at leas tone selectable permission that corresponds to the retrieved corresponding only one of the plurality of distinct column values;

displaying the each row when the retrieved at least one selectable permission indicates that the grantee has permission to view the each row; and hiding the each row when the retrieved at leas tone selectable permission indicates that the grantee does not have permission to view the each row.

2. The method according to claim 1, wherein when only the grantee is selected and when the statistical list needing authorization and the column needing authorization in the statistical list are selected, status of a permission previously authorized for the grantee to operate statistical data corresponding to each column value in the column in the statistical list is displayed.

3. The method according to claim 1, wherein when only the grantee is selected and when the statistic list needing authorization and the column needing authorization in the statistical list are selected, an operator who last authorizes the column in the statistical list for the grantee and time of such authorization are displayed.

4. The method according to claim 1, wherein the grantee is an independent individual not a group/class, and one role can only be related to a unique user, while one user is related to one or more roles.

\* \* \* \* \*